No. 756,603. PATENTED APR. 5, 1904.
F. F. DOW.
VAPOR BURNER.
APPLICATION FILED FEB. 4, 1901.
NO MODEL.
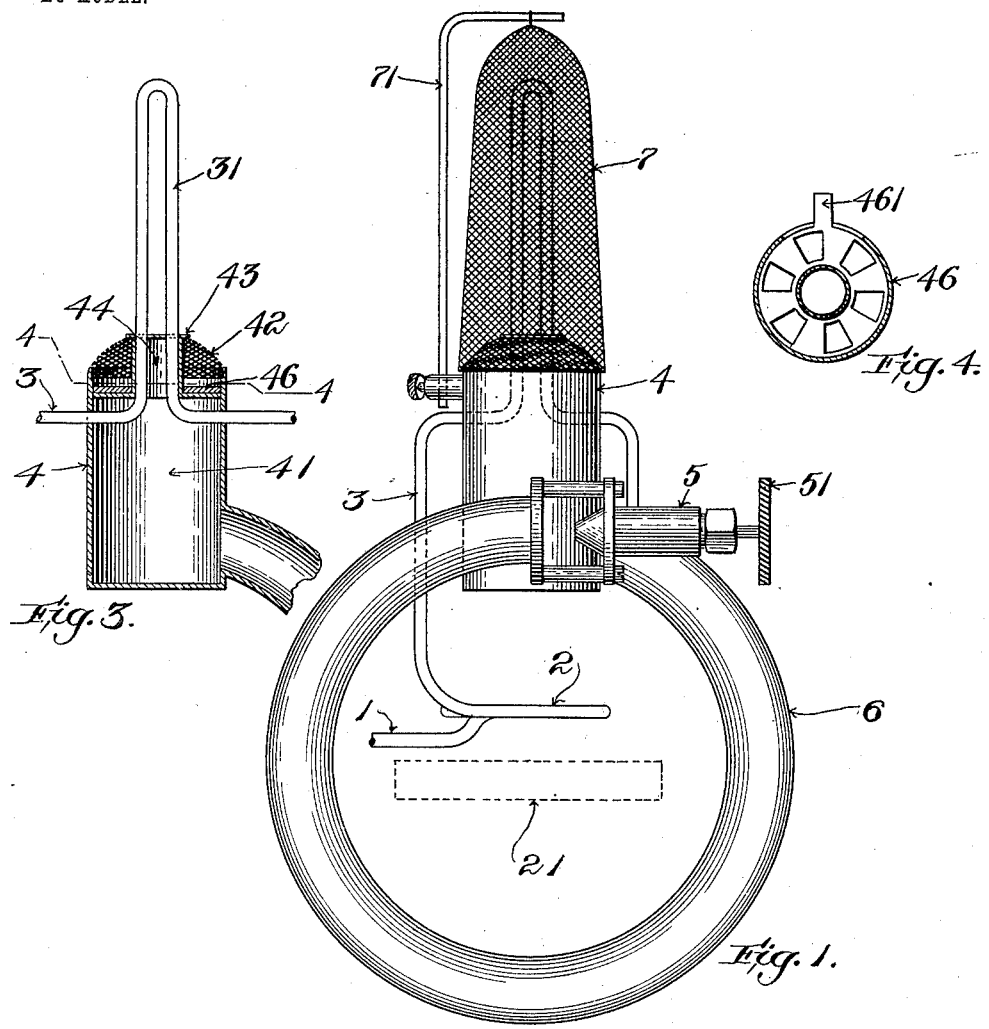
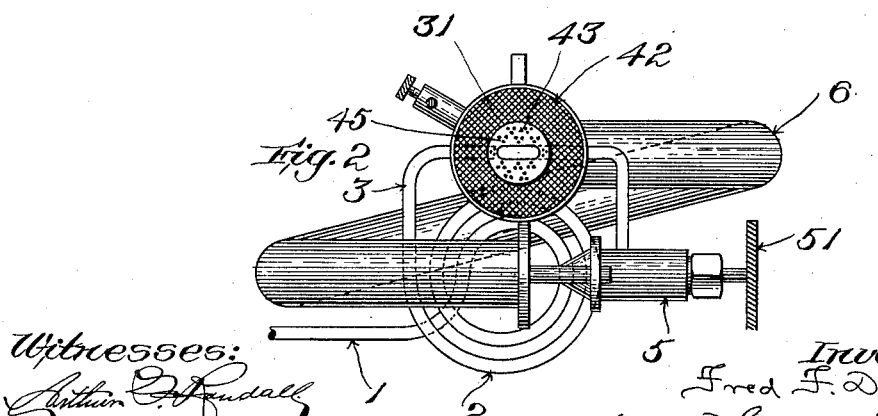
Witnesses:
Arthur ...Randall
Oscar F. Hill
Inventor:
Fred F. Dow
by Macleod Calver & Randall
Attorneys No. 756,603. Patented April 5, 1904.

UNITED STATES PATENT OFFICE.

FRED F. DOW, OF FREDERICTON, CANADA.

VAPOR-BURNER.

SPECIFICATION forming part of Letters Patent No. 756,603, dated April 5, 1904.

Application filed February 4, 1901. Serial No. 45,889. (No model.)

*To all whom it may concern:*

Be it known that I, FRED F. DOW, a citizen of the United States, residing at Fredericton, in the county of York, New Brunswick, Canada, have invented a certain new and useful Improvement in Vapor-Burners, of which the following is a specification, reference being had therein to the accompanying drawings.

The general object of the invention is to produce a novel and improved lamp or burner consuming liquid or hydrocarbon fuel which shall be capable of effecting complete and perfect combustion of the fuel used therein and of securing the maximum effect for either lighting or heating purposes.

One special aim of the invention is to produce a simple, practical, and safe lamp or burner in which the oil supplied for fuel shall first be converted into gas or vapor, then mixed with a supply of air ample to insure absolutely perfect combustion, so that there shall be an entire absence of smell and of deposit from the flame, and the mixture of air and gas or vapor shall be raised to and maintained at a high temperature and be delivered at the burner in the best state for consumption, whereby the efficiency and economy of the burner are enhanced, since the amount of heat required to be expended at the burner in raising the mixture to the temperature at which combustion occurs is minimized.

Another special aim of the invention is to produce a lamp or burner particularly adapted for the consumption of kerosene in the ordinary commercial condition of the latter.

In the drawings, Figure 1 shows in elevation a lamp embodying the features of the present invention. Fig. 2 is a plan thereof with the mantle and mantle-support removed. Fig. 3 is a detail view in section on a vertical plane, showing the burner and parts connected therewith. Fig. 4 is a detail view in section on the horizontal plane indicated by the dotted line 4 4, Fig. 3, looking in the direction indicated by the arrows adjacent the ends of such line.

Having reference to the drawings, at 1 is shown a supply-pipe through which the fuel which is to be fed to the lamp is led toward the latter. Inasmuch as liquid hydrocarbons—for instance, kerosene—will most generally be employed in practice as fuel, I designate the pipe 1, for convenience, the "oil-supply" pipe, although it will be borne in mind that on occasion the character, &c., of the fuel will be varied, as deemed desirable. Ordinarily the oil passing through the pipe 1 to the lamp will be maintained under moderate pressure to insure a proper and sufficient feed thereof to the lamp. This pressure may conveniently be secured in practice by the well-known means of maintaining a pressure of air or gas within the supply reservoir or receptacle (not shown) with which the pipe 1 communicates.

2 is a coil into which the oil-supply pipe 1 is formed or with which the latter connects. This coil is utilized in starting the lamp for the purpose of converting the oil coming through the pipe 1 into gas or vapor, and in connection therewith below the same is provided a starting-burner 21, which in practice may be filled with asbestos or other suitable absorbent material, the latter being on occasion saturated with alcohol or the like, which is ignited for the production of heat. For convenience of designition I term the coil 2 the "starting-coil."

3 is a portion of pipe leading from the starting-coil 2 in continuation of the oil-supply pipe and through which the fuel flows toward the burner 4.

The burner 4 is of considerable internal capacity in order that its interior space 41 may constitute a gas-chamber adapted to contain a fairly considerable supply of a combustible mixture of gas or vapor and air. The upper end of the burner is covered by a cap 42, of wire-gauze or its equivalent, provided with a central baffle-disk 43, which last acts to destroy the tendency of the flame to rise centrally in the shape of a slender tapering point. In the present embodiment of the invention the disk 43 is secured to the upper end of a short tube 44, having its lower end open.

The continuation of the supply-pipe passes through the side of the shell of the burner 4 and projects into the interior space of the burner. It then extends upward centrally of the burner through the tube 44 and disk 43, being carried to some considerable height above the burner and within the circuit of the flame therefrom. Above the burner the pipe is bent and doubled upon itself, as shown, one or more times to form what I term the "gas-generating coil" 31, and then the pipe extends down through disk 43 and tube 44 into the central space or gas-chamber 41 of the burner out through the side of the shell of the burner on its way to the injection-valve 5, the stem of the latter being furnished with the hand-wheel 51 for purposes of regulation.

From the discharge-opening of the injection-valve 5 the gas flows into and through the mixing-pipe 6, which last connects with and discharges into the burner-shell. The mixing-pipe is herein shown in the form of a continuous spiral having the injection-valve combined with its open outer end and the burner combined with its other or inner end. In this particular embodiment of the invention the mixing-pipe is formed as a continuous coil of uninterrupted and regular curve from the injection-valve to the burner, providing thus for the smooth, noiseless, and unchecked onward movement of the mixture of air and gas entering at the outer end thereof. One special aim in the present connection is to do away with noise. The continuous mixing pipe is free from the metallic roaring sound, which in some instances has been experienced when a jet of gas under high pressure is directed into the open end of a short straight cylindrical mixing-pipe, so as to flow directly through the said mixing-pipe into an enlarged storage-chamber in connection therewith. In the present instance there is no enlarged storage-chamber. The mixing-pipe itself is of a diameter and length sufficient to give the required storage capacity. The absence of short bends or turns in the mixing-pipe permits an undisturbed and unchecked onward flow of the mixture of air and gas. The injection-valve 5 is mounted upon the outer end of the mixing-pipe, as shown clearly in the drawings. In consequence of the fact that the said end is open to the external air adjacent to the valve a considerable volume of air is permitted to flow into the mixing-pipe and is carried through the latter by the moving stream of gas. The mixing-pipe is of sufficient internal capacity to provide for the complete mixing therein of the requisite amount of atmospheric air with the gas which is generated from the oil, as aforesaid, so as to provide for complete and perfect combustion, and also of capacity sufficient to constitute a storage chamber or reservoir for a sufficient quantity of the mixture of gas and air to supply the needs of the burner and keep the flame thereof steady at all times.

The heat which is applied to the starting-coil, as by means of the flame from the starting-burner 21, converts the contents of the supply-pipe into gas or vapor and starts the flow of the latter from the injection-valve into the mixing-pipe and the burner. After the lamp has been lighted and started in operation the flame from the burner heats the gas-generating coil 31, which latter is exposed to the said flame, as aforesaid, and thereafter the contents of the supply-pipe are vaporized by the action of the flame of the burner itself.

The purpose in view in leading the supply-pipe into the interior of the burner is to subject the contents of the same within the said interior to the heat of the gaseous contents of the burner. The flame which warms the starting-coil having burned out or been extinguished the oil or other fuel will pass on comparatively cool until it reaches the portion of pipe which passes through the side of the burner and into the interior space of the burner. Here it receives a preliminary warming, due to the heat of the gaseous contents of the burner, the said contents acquiring a very high temperature during the use of the lamp. The final heating and conversion into gas or vapor of high tension are effected within the gas-generating coil. The passage of the said gas or vapor down from the said coil through the portion of pipe extending within the burner on its way to the injection-valve assists in heating the gaseous contents of the burner.

For the purpose of producing a pilot-burner small holes 45 45 are made through the central disk 43 of the cap of the burner.

46, Figs. 3 and 4, is a hand-operated butterfly-valve surrounding the central tube 44, by means of which the flow of the mixture of gas and air from the interior of the burner through the annular space surrounding the tube 44 may be shut off or established at will. The movable disk of the said valve is furnished with a projection 461 for convenience of manipulation. When this valve is closed the main flame from the burner becomes extinguished; but the jets which continue to issue from the holes 45 45 remain lighted, constituting a pilot-light. When the valve is opened again so as to permit free flow from the outer portion of the burner to take place, the escaping volume of mixed gas and air becomes ignited from the pilot-light.

The holes 45 45 are formed in small groups of three, as shown, or more. I have ascertained by experience and experiment that if single, separated, or detached holes are provided for the purpose the fine jets issuing therethrough will produce an unpleasant rushing or hissing sound like that due to the escape of steam through similar holes. I have also found that if the holes are formed in small groups of three or some similar number and arranged closely together in each group the jets issuing from the several holes of a group will unite in the form of a solid and compact flame, more heat will be obtained for the continued warming of the generating-coil, the noise will be done away with, and the pilot-light is much less liable to accidental extinguishment.

7 is an incandescing mantle, and 71 a mantle-support, which may be employed when the lamp is used for lighting purposes or omitted when the lamp is employed for heating purposes.

I do not restrict myself in all respects to the precise construction and arrangement of parts which have been described and shown herein, since variation may be made therein in conformity with the exigencies of use and according to the views of the makers of lamps or burners embodying the invention.

It is contemplated that the lamp or burner shall be controlled mainly by manipulation of the stem of the injection-valve. A complete closing of the said injection-valve will shut off entirely the supply of fuel and with the result that the lamp or burner will become wholly extinguished. Ordinarily, however, the said injection-valve will not be entirely closed at any time; but when the use of the lamp is to be discontinued the valve 46 is closed, while the injection-valve is left open a very little bit, so as to permit a small flow of gas into and through the mixing-pipe to maintain the supply for the pilot-light. The latter will keep the gas-generating coil heated sufficiently to convert the oil reaching the same into gas or vapor, which will meet the needs of the pilot-light.

I claim as my invention—

1. The improved lamp or burner comprising the combination with the main burner having a valve and a central baffle-disk having the pilot-burner perforations, of the injection-valve, the mixing-pipe discharging by one end thereof into the burner and having the injection-valve arranged to discharge into its open outer end, and the supply-pipe extending up through the top of the burner into the flame therefrom and connecting with the injection-valve, substantially as described.

2. The improved lamp or burner comprising the combination with the main burner having the central pilot-burner and the valve controlling the flow through the main part of said burner, of the injection-valve, the mixing-pipe discharging by one end thereof into the said main burner and having the injection-valve arranged to discharge into its open outer end, and the supply-pipe extending up through the top of the burner into the flame therefrom and connecting with the injection-valve, substantially as described.

3. The improved lamp or burner comprising the combination with the main burner having the pilot-burner and the valve controlling the flow through the main part of said burner, of the injection-valve, the mixing-pipe discharging by one end thereof into the said main burner and having the injection-valve arranged to discharge into its open end, and the supply-pipe extending above the top of the burner into the flame therefrom and connecting with the injection-valve, and also provided with the starting-coil, substantially as described.

4. The improved lamp or burner comprising the combination with the main burner having the pilot-burner and the valve controlling the flow through the main part of said burner, of the injection-valve, the mixing-pipe discharging by one end thereof into the said main burner and having the injection-valve arranged to discharge into its open outer end, and the supply-pipe provided with the starting-coil and extending into the interior of the burner into contact with the gaseous contents thereof, and also extending through the top of the said main burner and above the latter within the flame therefrom and connecting with the injection-valve, substantially as described.

5. The improved hydrocarbon lamp or burner, comprising the combination with a body containing a gas-chamber and provided at the top of said gas-chamber with a main burner, and also provided with a pilot-burner consisting of a series of groups of minute perforations, each group appreciably removed from the other groups, of a mixing-tube communicating with the said gas-chamber, an injection-valve discharging into said mixing-tube, and a gas-generator located above the top of the gas-chamber and over the said pilot-burner and communicating with the said injection-valve, substantially as described.

6. The improved burner provided with the gas-chamber, main and pilot burner outlets, a valve controlling the flow through the main-burner outlets, an injection-valve, a continuously-curved mixing-pipe discharging by one end thereof into the said main burner and having the injection-valve arranged to discharge into its open end, a vapor-generating pipe extending above the top of the burner into the flame therefrom and connecting with the injection-valve, and a starting-coil connected with said vapor-generating pipe, substantially as described.

In testimony whereof I affix my signature in presence of two witnesses.

FRED F. DOW.

Witnesses:
CHAS. F. RANDALL,
WILLIAM A. COPELAND.